3,240,785
1,3-CYCLOHEXANEDIOLS
James C. Martin, Kingsport, Tenn., assignor to Eastman Kodak Company, Rochester, N.Y., a corporation of New Jersey
No Drawing. Filed Dec. 14, 1962, Ser. No. 244,565
8 Claims. (Cl. 260—294.7)

This invention relates to novel organic compounds and more particularly to novel 5-amino-1,3-cyclohexanediols.

The novel compounds of the invention are tertiary amino-substituted 1,3-cyclohexanediols which are useful in the preparation of linear polymers such as polyesters, polycarbonates, and polyurethanes, such polymers being in turn useful in the manufacture of fibers, films and molded articles. The novel diols can be represented by the following general formula:

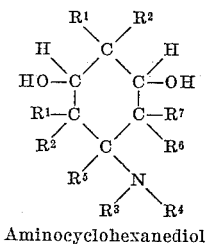

Aminocyclohexanediol

The substituents, $R^1$ and $R^2$ can be selected from a broad class of monovalent or bivalent organic radicals having from 1 to about 18 carbon atoms. These can include, for example, such monovalent organic radicals as: alkyl and cycloalkyl, particularly $C_1$-$C_8$ alkyl (preferably, lower alkyl), cyclopentyl and cyclohexyl; aryl, particularly phenyl and lower alkyl- or lower alkoxy-substituted phenyl; thienyl; alkenyl, particularly lower alkenyl; and carbalkoxy, particularly wherein the alkoxy radical thereof has 1 to 8 carbon atoms. $R^1$ and $R^2$ can also be joined bivalent organic radicals that form a cyclic radical with the carbon to which they are attached. For instance, $R^1$ and $R^2$ can be lower alkylene radicals joined to form a saturated carbocyclic ring. In addition, $R^1$ and $R^2$ can be groups containing carbon, hydrogen and oxygen atoms which with the carbon atoms to which they are attached, form a heterocyclic ring having 4 to 5 carbon atoms and an oxygen atom in the ring, such as the radicals derived from dihydropyrans, dihydrofurans, tetrahydrofurans and tetrahydropyrans.

In the preferred embodiments of the invention, $R^1$ and $R^2$ are saturated hydrocarbon radicals of 1 to about 8 carbon atoms, e.g., lower alkyl radicals or joined lower alkylene radicals, the latter forming a ring, e.g., cyclopentyl or cyclohexyl, with the carbon atoms to which they are attached.

$R^3$ and $R^4$ can be the same or different monovalent radicals of the types discussed above with regard to $R^1$ and $R^2$. $R^3$ and $R^4$ can also be joined bivalent radicals which, with the nitrogen to which they are attached, form a heterocyclic radical such as pyrrolidino, piperidino, morpholino or such heterocyclic radicals having substituents such as lower alkyl, lower alkoxy or lower thioalkyl.

One important characteristic of the compounds of the invention is that the substituent $R^5$ must be either hydrogen or a saturated monovalent organic radical free of labile hydrogen atoms and the atom by which the radical is connected to the ring carbon atom must be carbon. In other words, unless $R^5$ is hydrogen, there must be a carbon-carbon bond between the substituent $R^5$ and the ring carbon atom. Preferably, $R^5$ is hydrogen but other suitable substituents $R^5$ include: alkyl, preferably lower alkyl; cycloalkyl, preferably cyclopentyl or cyclohexyl; and mononuclear aryl, including lower alkyl- or lower alkoxy-substituted phenyl.

The substituents $R^6$ and $R^7$ can be hydrogen or monovalent or bivalent organic radicals of the same types discussed above with regard to $R^1$ and $R^2$. In the broadest aspects of the invention one or both of the substituents $R^6$ and $R^7$ can be hydrogen. However, the products such as polyesters and the like formed from the diols in which $R^6$ and $R^7$ are organic radicals have better thermal stability than those prepared from the diols in which either $R^6$ and $R^7$ is hydrogen. Accordingly, in the preferred embodiments of the invention $R^6$ and $R^7$ are both monovalent or bivalent organic radicals of the types indicated and, most preferably, are saturated hydrocarbon radicals of 1 to about 8 carbon atoms, e.g., lower alkyl radicals or joined lower alkylene radicals, the latter forming a ring, e.g., cyclopentyl or cyclohexyl, with the carbon atom to which they are attached.

The novel diols are prepared by the reduction of corresponding amino cyclohexanediones of the types disclosed in my co-pending patent application Serial No. 244,566, entitled "1,3-Cyclohexanediones," filed concurrently herewith. This preparation can be represented by the following equation:

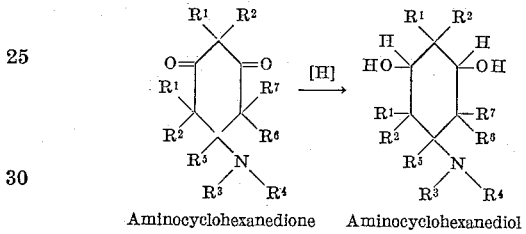

Aminocyclohexanedione    Aminocyclohexanediol

The dione can be reduced to the novel diol in accordance with the above equation by reaction with a chemical reducing agent such as lithium aluminum hydride, sodium borohydride, metallic sodium in ethanol [Bouveault, Blanc Reduction], etc. On a commercial scale the preferred procedure is to reduce the dione by catalytic hydrogenation. Suitable hydrogenation catalysts include ruthenium, rhodium, Raney nickel, supported nickel, e.g., nickel on kieselguhr or other support, copper-chromite and the like. The preferred hydrogenation procedure comprises contacting the dione with hydrogen in an autoclave at a pressure, e.g. of 500 to 5000 p.s.i.g. and in the presence of a catalyst consisting essentially of ruthenium supported on activated carbon or alumina, containing, e.g., 0.1 to 10 weight percent ruthenium. The hydrogenation can also be carried out by a continuous vapor-phase procedure wherein the dione is passed continuously through a column-type reactor containing a pelleted catalyst of the supported ruthenium type.

As disclosed in said co-pending application, the cyclohexanediones used as starting materials for the diols of the present invention are prepared by the cycloaddition of the substituted ketene with a tertiary enamine in a 2:1 molar ratio. The reaction is carried out by contacting a ketene of the type, $R^1R^2C=C=O$, with the enamine of the type, $R^3R^4NC(R^5)=CR^6R^7$, in the presence of an aprotic dipolar solvent having a dipole moment greater than 2.0 Debye units. As illustrations of suitable substituted ketenes for the preparation of such cyclohexanediones, and hence as illustrations of suitable substituents $R^1$ and $R^2$ in the diols of the present invention the following can be mentioned: methylketene, ethylketene, n-propylketene, isoproylketene, n-butylketene, isobutylketene, phenylketene, dimethylketene, ethylmethylketene, diethylketene, n-butylethylketene, di-n-propylketene, di-isobutylketene, di-n-butylketene, di-n-heptylketene, ethyldodecylketene, dioctadecylketene, camphoketene, dibenzylketene, ditolylketene, diallylketene, dicarbethoxyketene, tetramethyleneketene, pentamethyleneketene, diphenylketene, methylphenylketene, allylmethylketene methylcarbethoxyketene, ethylcarbethoxyketene, n-propyl-carbomethoxyketene, and the like.

The enamines used in the preparation of the dione will likewise determine the identity of the substituents $R^3$, $R^4$, $R^5$, $R^6$ and $R^7$ in the diols of the present invention.

Of the suitable enamines the preferred type comprises those having no β-hydrogen atoms, i.e., $R^6$ and $R^7$ are both organic radicals. Such enamines can be prepared by reacting an aldehyde having one α-hydrogen atoms with a secondary amine. Typical enamines of this type include: N,N-dimethylisobutenylamine, N,N-diethylisobutenylamine, N,N-dibutylisobutenylamine, N-isobutenyl-piperidine, N - isobutenylpyrrolidine, N,N - dimethyl - 2-methylbutenylamine, N - (2 - methylbutenyl)piperidine, N,N-dimethyl - 2 - ethylbutenylamine, N - (2 - ethyl-butenyl)piperidine, N - (methylenecyclohexyl)dimethyl-amine, N - (methylenecyclohexyl)piperidine, N - iso-butenylmorpholine, N - (2 - ethylhexenyl)morpholine, N - (2 - ethylhexenyl)piperidine, N,N - dimethyl - 2-ethylhexenylamine, 3 - isobutenyl - 3 - azabicyclo[3,2,2,] nonane, 5 - dimethylaminomethylene - 2 - norbornene, 2-diisopropylaminomethylene - 2 - (2,3 - dihydro - 4H-pyran), 2 - (2 - dimethylamino - 1 - ethylvinyl)thiophene, 2 - dimethylamino - 1,1 - diphenylethylene, and the like.

Another type of enamine that can be used in preparing the diones is the type having at least one hydrogen atom on the β-carbon atom. Enamines of this type can be prepared by reacting a secondary amine with an aldehyde having at least two α-hydrogen atoms. Examples of such secondary amines include: sample dialkylamines such as dimethylamine, diethylamine, dibutylamine; heterocyclic secondary amines such as pyrrolidine, piperidine, morpholine, piperazine and 1-methylpiperazine; and secondary aromatic amines such as N-methylaniline Typical aldehydes having at least two α-hydrogen atoms include: propionaldehyde, butyraldehyde, valeraldehyde, heptaldehyde, acetaldehyde, phenylacetaldehyde, etc. Examples of a few of the resulting enamines having at least one β-hydrogen atom obtained by the reaction of such secondary amines and aldehydes include: N-(1-butenyl) piperdine, N,N-dimethylvinylamine, N,N-dimethylpropenylamine, N-(1-butenyl)pyrrolidine. N,N-dimethyl-1-butenylamine, N,N-dibutyl-1-butenylamine, N-(1-heptyl) morpholine, and the like.

Although the reactions employing any of the types of ketenes and enamines discussed above and the novel compounds having the cyclohexanedione structure obtained by such reactions can be used to prepare novel diols of the present invention, there are significant differences between certain classes of the reactants and products. Thus, when the reaction producing the starting diones employs a ketoketene, such as dialkylketene, and an enamine having no β-hydrogen atoms, i.e., an enamine prepared from aldehydes having one α-hydrogen atom, the resulting product is a substituted cyclohexanedione having no hydrogen atoms on the carbon atoms adjacent to the carbonyl groups. In other words, all of the substituents $R^1$, $R^2$, $R^6$ and $R^7$ are organic radicals. Compounds of this type have superior thermal stability.

When the reaction is carried out with a ketene having one α-hydrogen atom or an enamine having at least one β-hydrogen atom, the resulting substituted cyclohexanedione and the cyclohexanediol of the invention have at least one hydrogen atom on a carbon adjacent to the carbonyl groups. In other words, at least one of the substituents, $R^1$, $R^2$, $R^6$ or $R^7$ is a hydrogen atom. Diols of this type are useful new compounds but are not so stable thermally as the other cyclic diols of the invention. In order to obtain such compounds in satisfactory yield, the reaction of the ketene and the enamine and the reduction of the dione must be carried out at a temperature below about 50° C., preferably below about 10° C., and to avoid decomposition, the products must not be heated above about 50° C. for any substantial length of time.

As a general rule the thermal stability of the cyclic diols of the invention increases with an increase in the size of the alkyl substituents on the carbon atoms adjacent to the carbonyl group. For example, a compound of the invention in which the substituents $R^1$, $R^2$, $R^6$ and $R^7$ are methyl groups is less stable thermally than a compound otherwise identical in structure but in which $R^1$, $R^2$, $R^6$ and $R^7$ are butyl groups. This principle will influence the choice of a particular temperature below about 50° C. for preparing any specific compound in the class of the less stable compounds of the invention.

The following examples illustrate the preparation of novel compounds of the invention and their utility.

Example 1

A solution of 50 g. (0.185 mole) of 2,2,4,4,6,6-hexamethyl-5-piperidino-1,3-cyclohexanedione in 100 ml. of tetrahydrofuran was added slowly to a stirred solution of 11.4 g. (0.3 mole) of lithium aluminum hydride in 200 ml. of tetrahydrofuran. The reaction was kept at 10–20° C. during the addition and later refluxed for 1 hour. The solution was cooled to 5° C. and 12 ml. of water was added slowly. This was followed by the addition of 9 ml. of 20 percent sodium hydroxide solution and finally by 38 ml. of water. The mixture was filtered and the solid was washed with several portions of tetrahydrofuran. The filtrate was evaporated to give 49.4 g. of solid, M.P. 208–211° C. Recrystallization from toluene gave 36.3 g. (72 percent of 2,2,4,4,6,6,-hexamethyl-5-piperidino-1,3-cyclohexanediol, M.P. 211–213° C.

Analysis.—Calcd. for $C_{17}H_{33}NO_2$: C, 72.1; H, 11.7; N, 5.0. Found: C, 71.9; H, 11.5; N, 4.9.

Example 2

Using the general method described in Example 1, 48 g. (0.2 mole of 5-dimethylamino-2,2,4,4,6,6-hexamethyl-1,3-cyclohexanedione in 200 ml. of tetrahydrofuran was added to 11.4 g. (0.3 mole) of lithium aluminum hydride in 150 ml. of tetrahydrofuran. Work-up of the reaction mixture gave 32.1 g. (68 percent) of 5-dimethylamino-2,2,4,4,6,6-hexamethyl - 1,3 - cyclohexanediol, M.P. 208–210° C.

Anaylsis.—Calcd. for $C_{14}H_{29}NO_2$: C, 69.2; H, 11.9; N, 5.8. Found: C, 68.8; H, 12.0; N, 5.6.

Example 3

Using the general method described in Example 1, 5-dimethylamino - 2,2,4,4, - tetraethyl - 6,6 - dimethyl-1,3-cyclohexanedione was reduced in 71 percent yield to 5-dimethylamino - 2,2,4,4 - tetraethyl - 6,6 - dimethyl-1,3-cyclohexanediol.

The diols of the invention are useful as intermediates in the preparation of high molecular weight linear polymers having valuable properties. For instance, they can be reacted with dicarboxylic acids to form linear polyesters. The preparation of such polyesters can employ carboxylic acids, e.g., adipic, azelaic, phthalic, etc, and reaction procedures such as disclosed in "Polyesters and Their Applications" by Bjorksten et al., Reinhold Publishing Corp. (1956). The diols can be reacted with phosgene or with diaryl carbonates such as diphenyl carbonate, etc, to form polycarbonates according to procedures disclosed in "Polycarbonates" by W. F. Christopher and D. W. Fox, Reinhold Publishing Corp. (1962). The diols can also be reacted with bifunctional hydrocarbon diisocyanates, e.g., hexamethylenediisocyanate, 4,4'-methylenbis(phenyl isocyanate), n-tolylenediisocyanate, etc. of the types and in manner described in the patent to Martin and Elam, U.S. 3,038,884. The following example illustrates the preparation of such a polyurethane polymer.

Example 4

A solution of 14.05 g. (0.05 mole) of 2,2,4,4,6,6-hexamethyl-5-piperidino-1,3-cyclohexanediol in 75 ml. of dimethylsulfoxide was added to a rapidly stirred solution of 12.51 g. (0.05 mole) of 4,4'-methylene(phenyl isocyanate) in 75 ml. of 4-methyl-2-pentanone. The resulting solution was heated at 100–110° C. for 1 hour and 15 minutes. The solution was cooled, poured into water and the light yellow polymer was collected by filtration. The polymer melted about 210° C. and had an inherent viscosity of 0.31, as measured in dimethylformamide at room temperature. A film cast from a dimethylformamide solution of the polymer was tough and pliable.

The polymers formed from the novel diols of the invention have tertiary amino substituents which make the polymers hydrophilic. Consequently, with fibers made from the polymers the problem of static electrical charge is reduced and the fibers are dyeable by acid dyes of the types suitable for wool. Furthermore, the diols of which all of the ring substituents $R^1$, $R^2$, $R^6$ and $R^7$ are organic radicals, preferably $C_1$–$C_8$ alkyl, form esters, urethanes, and polycarbonates that are characterized by good hydrolytic and thermal stability. In addition to manufacture of polymers the cyclohexanediols are useful as sludge inhibitors for petroleum fuel oils.

The invention has been described in considerable detail with particular reference to certain preferred embodiments thereof, but it will be understood that variations and modifications can be effected within the spirit and scope of the invention as described hereinabove, and as defined in the appended claims.

I claim:

1. A compound of the formula:

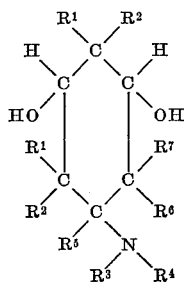

wherein $R^1$, $R^2$, $R^5$, $R^6$ and $R^7$, taken singly, are hydrogen or $C_1$–$C_8$ alkyl; $R^3$ and $R^4$, taken singly, are $C_1$–$C_8$ alkyl; $R^1$ and $R^2$, taken collectively, are alkylene which form a 5 to 6 membered saturated carbocyclic ring with the carbon atom to which they are attached; $R^3$ and $R^4$, taken collectively with the nitogen atom to which they are attached, form a pyrrolidinyl, piperidino or morpholino ring; and when one of $R^1$ and $R^2$ is hydrogen the other is $C_1$–$C_8$ alkyl.

2. A compound according to claim 1 wherein $R^1$, $R^2$, $R^3$, $R^4$, $R^6$ and $R^7$ are $C_1$–$C_8$ alkyl and $R^5$ is hydrogen.

3. A compound according to claim 1 wherein $R^1$ and $R^2$ form a 5 to 6 membered saturated carbocyclic ring with the carbon atom to which they are attached, $R^3$, $R^4$, $R^6$ and $R^7$ are $C_1$–$C_8$ alkyl and $R^5$ is hydrogen.

4. A compound according to claim 1 in which $R^1$ and $R^2$ form a 5 to 6 membered saturated carbocyclic ring with the carbon atom to which they are attached, $R^3$ and $R^4$ form a pyrrolidinyl, piperdino or morpholino ring with the nitrogen atom to which they are attached, $R^5$ is hydrogen and $R^6$ and $R^7$ are $C_1$–$C_8$ alkyl.

5. A compound according to claim 1 in which $R^1$ and $R^2$ form a 5 to 6 membered saturated carbocyclic ring with the carbon atom to which they are attached, $R^3$ and $R^4$ form a pyrrolidinyl, piperidino or morpholino ring with the nitrogen atom to which they are attached, $R^5$ is hydrogen and $R^6$ and $R^7$ are $C_1$–$C_8$ alkyl.

6. 2,2,4,4,6,6-hexamethyl - 5 - piperidino-1,3-cyclohexanediol.

7. 5 - dimethylamino - 2,2,4,4,6,6 - hexamethyl-1,3-cyclohexanediol.

8. 5 - dimethylamino - 2,2,4,4 - tetraethyl-6,6-dimethyl-1,3-cyclohexanediol.

No references cited.

WALTER A. MODANCE, *Primary Examiner.*
NICHOLAS S. RIZZO, *Examiner.*